3,052,715
PREPARATION OF ESTERS
Albert L. Rocklin, Walnut Creek, Calif., assignor to Shell Oil Company, New York, N.Y., a corporation of Delaware
No Drawing. Filed Oct. 24, 1960, Ser. No. 64,314
6 Claims. (Cl. 260—488)

This invention relates to a novel process for the preparation of hydroxybenzyl esters and, more specifically, it relates to a process for preparing hydroxybenzyl esters from certain hindered phenols.

It has recently been found that the esters of certain 3,5-disubstituted 4-hydroxybenzyl alcohols have desirable antioxidant properties in such substrates as rubber, poly-alpha-olefins such as polypropylene and polyisoprene, and in gasoline. In general, these esters can be prepared by reacting together the 3,5-disubstituted 4-hydroxybenzyl alcohol with the carboxylic acid whose ester is desired. In this way, the esters are readily prepared in excellent yield.

It has now been found that these esters may be prepared directly from 2,6-disubstituted phenols, without the necessity of employing the hydroxybenzyl alcohol. It is therefore an object of this invention to provide a process for preparing carboxylic acid esters of 3,5-disubstituted 4-hydroxybenzyl alcohols by the reaction of 2,6-disubstituted phenols. Another object is the provision of such a method wherein the esters are prepared by reacting the 2,6-disubstituted phenol with formaldehyde and the anhydride of an organic carboxylic acid. Still another object of the invention is the provision of a process for preparing esters of hydroxybenzyl alcohols without the necessity of employing such alcohols in direct esterification. Other objects will be apparent from the following description of the invention.

These objects are accomplished in the invention by the process for the preparation of a hydroxybenzyl ester which comprises reacting together a cryptophenol having a replaceable hydrogen atom on the ring carbon atom para to the hydroxyl group, formaldehyde, the anhydride of an organic carboxylic acid, and the free carboxylic acid in the presence of a catalytic amount of a mineral acid, and separating the ester from the reaction mixture.

It is an important advantage of this process that it employs as a starting material the relatively inexpensive and easily available disubstituted phenols of commerce rather than the less available 3,5-disubstituted 4-hydroxybenzyl alcohols, which are produced by such methods as the reduction of the corresponding 3,5-disubstituted 4-hydroxy-benzaldehyde; see Coppinger et al., JACS 75, 734 (1953). These phenols may be generally described as cryptophenols; see Stevens et al., U.S. 2,298,660, issued October 13, 1942. By cryptophenol is meant a phenol substituted in the 2 and 6 positions relative to the hydroxyl group with alkyl, aryl or cycloalkyl groups sufficiently large to shield or protect the hydroxyl group, making it less susceptible to reaction. The phenols may also be substituted in the 3 and 5 positions, preferably with alkyl substituents having up to four carbon atoms.

Of particular interest are 2,6-disubstituted phenols having up to 8 carbon atoms in each of the substituents, having the structure

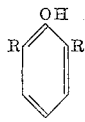

wherein each R is selected from the alkyl, cycloalkyl and aryl radicals, and wherein at least one of the substituents is branched on the alpha carbon atom. Representative of these phenols are 2-methyl-6-cyclohexylphenol; 2-methyl-6-tert-butylphenol; 2-ethyl-6-tert-amylphenol; 2-isopropyl-6-octylphenol; 2-ethyl-6-cyclopentylphenol; 2,6-diphenylphenol; 2,6-ditolylphenol; 2-methyl-6-isopropylphenol; 2-butyl-6-isobutylphenol; 2-propyl-6-phenylphenol; 2,6-dicyclohexylphenol; and the like. Most preferred, since these provide esters having the most effective antioxidant properties, are the 2,6-dialkylphenols wherein each of the alkyl radicals has up to 8 carbon atoms and is branched on the alpha carbon atom. These phenols are exemplified by 2,6-diisopropylphenol; 2,6-di-tert-butyl-phenol; 2,6-di-tert-amylphenol; 2,6-di-tert-octylphenol; 2-isopropyl-6-tert-butylphenol; 2-tert-butyl-6-tert-amyl-phenol; and the like.

The phenol is reacted with formaldehyde in the presence of the anhydride and the carboxylic acid to yield the 3,5-disubstituted 4-hydroxybenzyl ester. The formaldehyde is preferably employed in its substantially anhydrous form; it may be used either as monomeric formaldehyde, in the form of liquid or gas, or as polymeric formaldehyde, in the form of polyoxymethylene glycol, particularly the commercial mixture called paraformaldehyde. Even in the commercial form, paraformaldehyde may be obtained containing less than about 4% water and having the appearance of a colorless solid. Each of these forms is equally suitable in the conduct of the invention described.

In general, the art teaches that when formaldehyde and a phenol are reacted together under acid conditions, the principal reaction product is a bisphenol. However, it has now been found that when the reaction mixture contains the anhydride of an organic carboxylic acid under the conditions described, the reaction between the phenol, formaldehyde and the anhydride is the predominant reaction and the principal product is the 3,5-dialkyl-4-hydroxybenzyl ester, the bisphenol product appearing only as a by-product.

The anhydrides employed are those of organic mono- and polycarboxylic acids. Both hydrocarbon carboxylic acids and halogenated hydrocarbon carboxylic acids may be employed. It is preferred that these anhydrides be those of acids selected from alkyl and aromatic acids having up to four, and preferably no more than two carboxyl groups. Typical anhydrides include acetic anhydride, propionic anhydride, butyric anhydride, valeric anhydride, 2-ethylbutyric anhydride, 2-ethylhexoic anhydride, glutaric anhydride, adipic anhydride, stearic anhydride, diphenic anhydride, naphthalic anhydride, succinic anhydride, benzoic anhydride, phthalic anhydride, pyromellitic anhydride; most preferred anhydrides are those having no more than fourteen carbon atoms.

The proportions of these reactants may be varied widely. Preferably, however, approximately stoichiometric proportions of the phenolic and anhydride reactant are employed, that is, about one mole of the phenol for every equivalent of acyl radical in the anhydride. However, the formaldehyde may be employed in stoichiometric or greater amounts, preferably in from about one mole to five of formaldehyde per equivalent of acyl radical in the anhydride.

Reaction of the phenol with the formaldehyde and anhydride is carried out in the liquid phase, wherein the reaction mixture contains a catalytic amount of strong acid. Mineral acids such as the hydrogen halides, such as hydrochloric acid, sulfuric acid, and phosphoric acid may be used as well as the sulfonic acids such as benzenesulfonic acid, the toluenesulfonic acids such as p-toluenesulfonic acid, and the like. Preferred acids are those having dissociation constants greater than about $10^{-2}$. Amounts of the acid catalyst which may be conveniently employed range from about 0.01% to about 15% by weight, based on the phenol reactant, the concentration of acid required depending both on the nature of the acid itself and on the other reaction conditions.

The reaction is most effectively carried out in a liquid that is a solvent for both the reactants and the product. In the preferred embodiment of the process, the liquid solvent is a carboxylic acid, such as that whose anhydride is employed as a reactant. Typical acids include acetic acid, propionic acid, butyric acid, isobutyric acid, pentanoic acid, valeric acid, 2-ethylbutyric acid, 2-methylpentanoic acid, 2-ethylhexoic acid, decanoic acid, and caproic acid. Preferred acids are monocarboxylic alkanoic acids having up to 8 carbon atoms. Of these, the most preferred, by virtue of its convenience and low cost, is acetic acid. In general, the solvent should be one liquid at the temperature of the reaction, the reaction being readily conducted at a temperature beween about 0° C. and about 100° C. The solvent is conveniently employed in excess, that is, in amounts of greater than about a mole of solvent per mole of the phenol, with an upper range of about 20 moles of solvent on this basis being recommended. While the process may be conducted at superatmospheric or subatmospheric pressures, it takes place sufficiently satisfactorily at atmospheric pressure so that these special conditions are not required.

The ester products of the process of the invention are white or light-colored crystalline solids, characterized by antioxidant properties. Exemplary esters include 3,5-di-tert-butyl-4-hydroxybenzyl acetate; 3,5-diisopropyl-4-hydroxybenzyl benzoate; 3,5-di-tert-amyl-4-hydroxybenzyl propionate; 3,5-di-tert-butyl-2,6-dimethyl-4-hydroxybenzyl butyrate; di(3,5-di-tert-heptyl-4-hydroxybenzyl)phthalate; di(3,5-di-tert-amyl-4-hydroxybenzyl)adipate and tetra (3,5-di-tert-butyl-4-hydroxybenzyl)pyromellitate. Because in general these esters tend to crystallize from the reaction mixture, they may readily be separated from the system at the termination of the reaction by such convenient methods as filtration, centrifugation, and decantation. Alternatively, they may be separated from the solvent and reactants by distillation, extraction or the like. After separation, the esters are easily finished by washing, recrystallization or other conventional methods.

The preparation of the hydroxybenzyl esters of this invention may be conducted in a batch, semi-batch or continuous method, employing techniques and equipment obvious to those skilled in the art.

To illustrate further the novel process of the invention, the following specific examples are set forth. It should be understood, however, that these examples are merely illustrative and are not to be regarded as limitations to the appended claims since the basic teachings thereof may be varied at will as will be understood by one skilled in the art. In the examples, the proportions are expressed in parts by weight unless otherwise noted.

*Example I*

To a reaction vessel was charged 9.02 g. (0.3 mole) of paraformaldehyde, 100 ml. (about 1.6 mole) of glacial acetic acid, and 20.61 g. (0.1 mole) of 2,6-di-tert-butylphenol. The phenol was added to a cooled solution of the paraformaldehyde in the acetic acid under nitrogen, and to the resulting mixture was added 10 ml. (0.1 mole) of acetic anhydride. One drop of concentrated sulfuric acid was added to the reaction mixture and about ten minutes later nine more drops of sulfuric acid were added, and the mixture was allowed to stand at room temperature for about sixteen hours.

At the end of that time, a large crop of crystals was obtained in the reaction mixture. The entire mixture was then poured into a liter of water and the crystals filtered off. The resulting solids were stirred with another liter of water, filtered from the mixture, and washed again with water. The washed solids were dried thoroughly on a porous plate.

The solids were then recrystallized several times from n-hexane. In this way, a large yield of crystalline 3,5-di-tert-butyl-4-hydroxybenzyl acetate was obtained. The nature of the product was confirmed by infrared spectrometry, using for reference an authentic sample of the ester which had been prepared by an alternate synthetic route.

*Example II*

The process of Example I is repeated by reacting together 2,6-diisopropylphenol, formaldehyde and butyric anhydride in butyric acid at 35° C. The reaction is catalyzed by phosphoric acid.

In this way, 3,5-diisopropyl-4-hydroxybenzyl butyrate is obtained in good yield.

I claim as my invention:

1. The process for the preparation of a hydroxybenzyl ester, which comprises reacting together a cryptophenol having a replaceable hydrogen atom on the ring carbon atom para to the hydroxyl group, at least one mole of formaldehyde per mole of cryptophenol, and about one equivalent per mole of cryptophenol of the anhydride of a hydrocarbon carboxylic acid having up to 14 carbon atoms and up to four carboxyl groups, selected from the group consisting of alkyl and aromatic acids, in the presence of a catalytic amount of a mineral acid, in a solvent comprising at least one mole of organic carboxylic acid per mole of cryptophenol, and separating the resulting ester from the reaction mixture.

2. The process of claim 1 wherein the cryptophenol is 2,6-dialkylphenol, each of the alkyl groups having up to eight carbon atoms, and at least one of said alkyl groups being branched on the alpha carbon atom.

3. The process of claim 1 wherein the anhydride is acetic anhydride and the carboxylic acid is acetic acid.

4. The process for the preparation of a 3,5-dialkyl-4-hydroxybenzyl ester which comprises reacting in a solvent consisting essentially of an alkanoic monocarboxylic acid 2,6-dialkylphenol wherein each of the alkyl groups has up to eight carbon atoms and at least one of the alkyl groups is branched on the alpha carbon atom, with at least one mole of formaldehyde per mole of 2,6-dialkylphenol, and about one equivalent of the anhydride of the alkanoic monocarboxylic acid, in the presence of a catalytic amount of a mineral acid, and separating the ester from the reaction mixture.

5. The process of claim 4 wherein the 2,6-dialkylphenol is 2,6-di-tert-butylphenol.

6. The process for the preparation of 3,5-di-tert-butyl-4-hydroxybenzyl acetate which comprises reacting 2,6-di-tert-butylphenol, at least one mole of formaldehyde per mole of the phenol, and about one equivalent of acetic anhydride per mole of the phenol, together in a solvent consisting essentially of acetic acid, in the presence of a catalytic amount of sulfuric acid, and separating the 3,5-di-tert-butyl-4-hydroxybenzyl acetate from the reaction mixture.

References Cited in the file of this patent

UNITED STATES PATENTS 2,430,002     De Groote _____ Nov. 4, 1947